US008468986B2

(12) United States Patent
Ito et al.

(10) Patent No.: US 8,468,986 B2
(45) Date of Patent: Jun. 25, 2013

(54) ENGINE FUEL INJECTION CONTROL APPARATUS

(75) Inventors: Tomoki Ito, Hadano (JP); Satoshi Watanabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 693 days.

(21) Appl. No.: 12/785,754

(22) Filed: May 24, 2010

(65) Prior Publication Data
US 2010/0305834 A1 Dec. 2, 2010

(30) Foreign Application Priority Data

May 28, 2009 (JP) ................................. 2009-129412

(51) Int. Cl.
*F01L 1/34* (2006.01)
*F02M 51/00* (2006.01)
*F02B 47/08* (2006.01)

(52) U.S. Cl.
USPC ... 123/90.15; 123/478; 123/491; 123/568.14; 701/105; 701/113

(58) Field of Classification Search
USPC ............ 123/90.15, 568.14, 478, 491, 179.16; 701/103, 105, 113
See application file for complete search history.

(56) References Cited

U.S. PATENT DOCUMENTS

| | | | | |
|---|---|---|---|---|
| 4,782,810 A | * | 11/1988 | Shimoda et al. | 123/478 |
| 5,495,840 A | * | 3/1996 | Ohtsuka et al. | 123/478 |
| 5,735,248 A | * | 4/1998 | Matsuura et al. | 123/527 |
| 6,134,884 A | * | 10/2000 | Morinaga | 60/285 |
| 6,513,488 B2 | * | 2/2003 | Enoki et al. | 123/305 |
| 6,619,266 B2 | * | 9/2003 | Koseki | 123/478 |
| 6,681,741 B2 | * | 1/2004 | Majima et al. | 123/399 |
| 6,840,235 B2 | * | 1/2005 | Koseki et al. | 123/568.14 |
| 7,168,409 B2 | * | 1/2007 | Fukasawa | 123/305 |
| 7,621,256 B2 | * | 11/2009 | Cunningham et al. | 123/305 |
| 7,769,525 B2 | * | 8/2010 | Kakuya et al. | 701/103 |

(Continued)

FOREIGN PATENT DOCUMENTS

| | | |
|---|---|---|
| JP | 2002-195059 | 7/2002 |
| JP | 2003-83123 | 3/2003 |
| JP | 2005-061279 | 3/2005 |

OTHER PUBLICATIONS

An English translation of the Chinese Office Action of corresponding Chinese Application No. 201010188578.6, issued on Oct. 31, 2012.
An English translation of the Japanese Office Action of corresponding Japanese Application No. JP 2009-129412, dated Sep. 11, 2012, mailed Sep. 18, 2012.

*Primary Examiner* — Thomas Moulis
(74) *Attorney, Agent, or Firm* — Global IP Counselors, LLP

(57) ABSTRACT

An engine fuel injection control apparatus includes a variable valve device that at least varies an intake valve open timing of an intake valve. A controller adjusts the variable valve device and a fuel injection timing of a fuel injection valve. The controller controls a fuel injection end timing in accordance with an overlap amount of the intake valve and an exhaust valve. The controller adjusts the fuel injection timing such that the fuel injection end timing is more advanced than the intake valve open timing and such that as an amount by which the overlap amount exceeds a prescribed overlap amount becomes larger, a time interval between the fuel injection end timing and the intake valve open timing is set to become increasingly larger, upon determining that the engine is being cold started and the overlap amount is larger than the prescribed overlap amount.

13 Claims, 11 Drawing Sheets

U.S. PATENT DOCUMENTS

| | | | |
|---|---|---|---|
| 7,983,832 B2 * | 7/2011 | Sukegawa et al. | 701/105 |
| 7,992,537 B2 * | 8/2011 | Yi et al. | 123/295 |
| 8,061,311 B2 * | 11/2011 | Nakamura | 123/90.16 |
| 8,065,988 B2 * | 11/2011 | Hatamura | 123/347 |
| 8,166,959 B2 * | 5/2012 | Yi et al. | 123/575 |
| 8,224,555 B2 * | 7/2012 | Kumano et al. | 701/104 |
| 8,272,366 B2 * | 9/2012 | Chiba | 123/435 |
| 2002/0017256 A1 * | 2/2002 | Shiraishi et al. | 123/90.15 |
| 2011/0232607 A1 * | 9/2011 | Yoshioka | 123/445 |

* cited by examiner

ZERO LIFT

MAXIMUM LIFT (A)

(B)

ENGINE FUEL INJECTION CONTROL APPARATUS

CROSS-REFERENCE TO RELATED APPLICATIONS

This application claims priority to Japanese Patent Application No. 2009-129412, filed on May 28, 2009. The entire disclosure of Japanese Patent Application No. 2009-129412 is hereby incorporated herein by reference.

BACKGROUND

1. Field of the Invention

The present invention generally relates to an engine fuel injection control apparatus. More specifically, the present invention relates to an engine fuel injection control apparatus that improve cold starting.

2. Background Information

A conventional fuel injection control apparatus serves to control the injection of fuel into an intake port of an engine. In some conventional fuel injection control apparatus, an intake valve open timing is corrected to a later (more retarded) timing when the engine is cool in order to prevent fuel from sticking to an internal wall surface of the intake port due to a collision of fuel mist with exhaust gas blown back from a cylinder. In this conventional fuel injection control apparatus, control is also executed such that the blow back exhaust gas and the fuel injection timing do not overlap. In short, the intake valve open timing is retarded to such a degree that neither the combustion nor the exhaust performance is degraded. Also the intake valve open timing is retarded to such a degree that the amount of overlap with respect to the exhaust valve close timing is reduced such that the occurrence of exhaust gas blowback is weakened. An example of this type of conventional fuel injection control apparatus is disclosed in Japanese Laid-Open Patent Publication No. 2003-83123.

SUMMARY

It has been discovered that when the intake valve open timing is corrected to a more retarded timing with respect to a prescribed fuel injection timing such that interference between injected fuel and blow-back exhaust gas is suppressed, the fuel injection timing is not appropriate with respect to the gas flow surrounding the intake valve.

In view of the aforementioned problem of the conventional fuel injection control apparatus, one object of the present disclosure is to provide an engine fuel injection control apparatus that can reduce residual unburned hydrocarbons (unburned HC) by controlling the fuel injection timing appropriately during a cold start of an engine.

In view of the state of the known technology, one aspect of the present disclosure is to provide an engine fuel injection control apparatus that basically comprises an intake port, a fuel injection valve, a variable valve device and a controller. The fuel injection valve is provided in the intake port. The variable valve device at least varies an intake valve open timing of an intake valve provided downstream of the fuel injection valve. The controller is operatively connected to the variable valve device and the fuel injection valve to adjust the variable valve device and a fuel injection timing of the fuel injection valve. The controller controls a fuel injection end timing in accordance with an overlap amount of the intake valve and an exhaust valve. The controller adjusts the fuel injection timing such that the fuel injection end timing is more advanced than the intake valve open timing and such that as an amount by which the overlap amount exceeds a prescribed overlap amount becomes larger, a time interval between the fuel injection end timing and the intake valve open timing is set to become increasingly larger, upon determining that the engine is being cold started and the overlap amount is larger than a prescribed overlap amount.

BRIEF DESCRIPTION OF THE DRAWINGS

Referring now to the attached drawings which form a part of this original disclosure:

FIG. 9B is a graph of a retardation amount C of the fuel injection end timing from the intake valve open timing IVO versus the operating angle of the intake valve 23

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
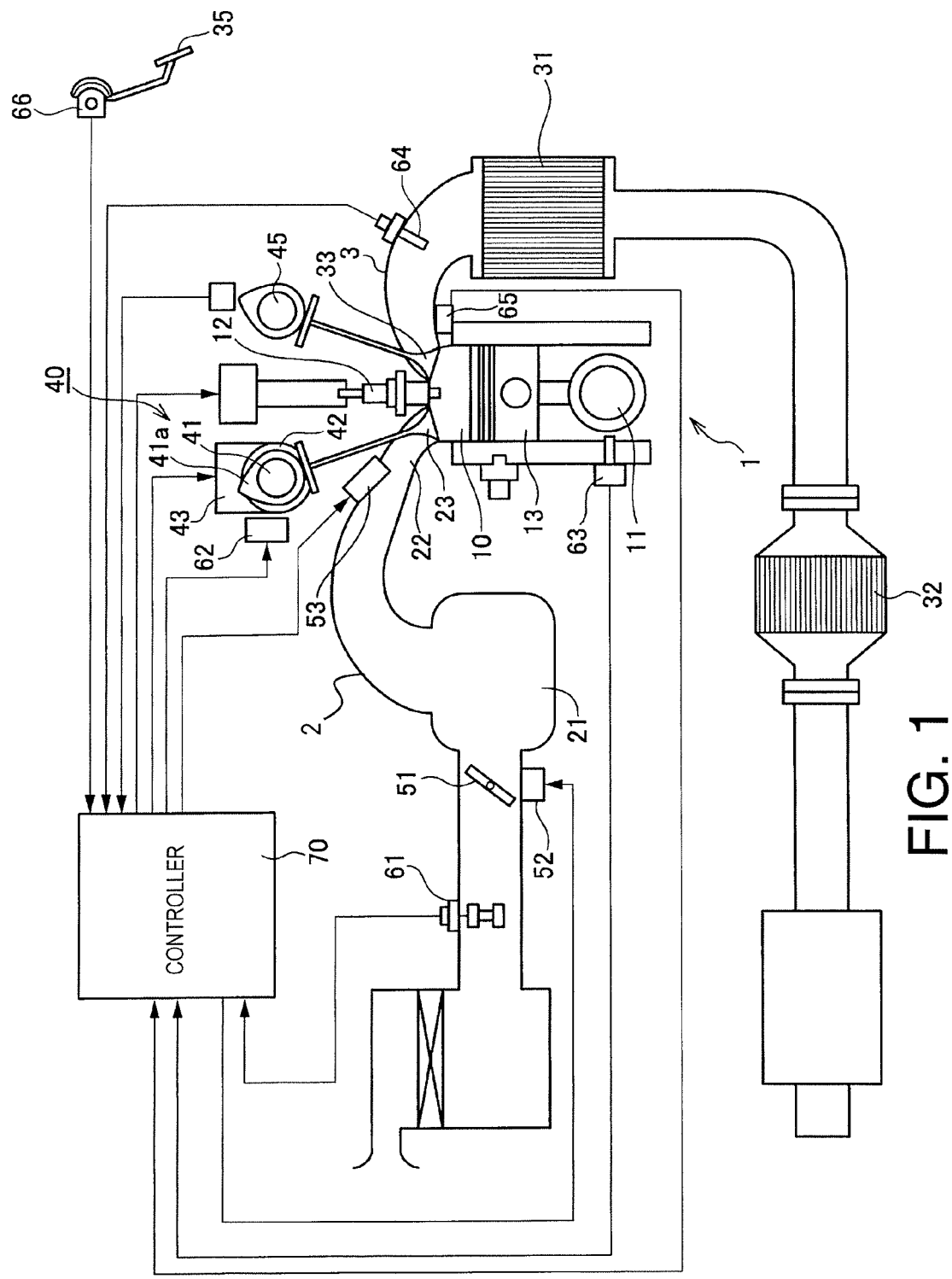
FIG. 1 is an overall schematic view of an internal combustion engine equipped with a fuel injection control apparatus in accordance with a first embodiment.

Referring initially to FIG. 1, an overall schematic view of an internal combustion system is illustrated having a fuel injection control apparatus in accordance with a first embodiment. As shown in FIG. 1, the internal combustion engine system includes an internal combustion engine 1 having an intake passage 2 and an exhaust passage 3. In the illustrated embodiment, the engine 1 is a port injection type engine. In the illustrated embodiment, the fuel injection control apparatus is configured to reduce residual unburned hydrocarbons (unburned HC) by controlling a fuel injection timing appropriately during a cold start of the engine 1. The term "configured" as used herein to describe a configuration of a component, section or part of the fuel injection control apparatus includes, but not limited to, hardware and/or software that is constructed and/or programmed to carry out the desired function.

The engine 1 includes a plurality of cylinders 10 (only one illustrated) and a crankshaft 11, with each of the cylinders 10 having a piston 13 coupled to the crankshaft 11. Each of the cylinders 10 is further provided with a spark plug 17. Moreover, each of the cylinders 10 is fluidly coupled to the intake passage 2. The intake passage 2 of the engine 1 further includes an intake collector 21 arranged in an upstream position and an intake port 22 arranged in a downstream position. The intake port 22 includes at least one intake valve 23.

The exhaust passage 3 of the engine 1 further includes a manifold catalytic converter 31, an underfloor catalytic converter 32 and at least one exhaust valve 33. The manifold catalytic converter 31 and the underfloor catalytic converter 32 are provided in the exhaust passage 3 of the engine 1 and serve to treat atmospheric pollutants contained in exhaust gas. More specifically, the manifold catalytic converter 31 and the underfloor catalytic converter 32 constitute a three-way catalytic converter that serves to cause hydrocarbons (HC), carbon monoxide (CO) and oxides of nitrogen (NOx) to react with oxygen chemically and produce water, carbon dioxide, and nitrogen, which are harmless. The manifold catalytic converter 31 and the underfloor catalytic converter 32 serve to simultaneously remove atmospheric pollutants produced in a narrow region centered on a stoichiometric air-fuel ratio. Exhaust gas flows from inside the cylinder 10 to the exhaust passage 3 when the exhaust valve 33 is opened. Atmospheric pollutants are removed from the exhaust gas as it passes through the manifold catalytic converter 31 and the underfloor catalytic converter 32. Then, the exhaust gas is discharged to the atmosphere.

The engine 1 further includes a variable valve timing control mechanism 40 (hereinafter called "VTC mechanism 40"). The VTC mechanism 40 serves to control the open and close timings of the intake valve 23. The structure of the VTC mechanism 40 is conventional and will only be explained briefly. The VTC mechanism 40 is a valve open timing control mechanism having an intake valve camshaft 41 and a cam sprocket 42. The camshaft 41 has an integrally formed cam 41a with the intake valve 23 being opened and closed by the cam 41a. The cam sprocket 42 is press fitted onto a tip end of the camshaft 41 such that cam sprocket 42 can rotate relative to the camshaft 41. The cam sprocket 42 rotates relative to the intake valve camshaft 41 in response to hydraulic pressure that is regulated by a hydraulic pressure control mechanism 43. The cam sprocket 42 rotates in synchronization with a crankshaft 11. Thus structured, the VTC mechanism 40 can vary the open/close timing of the intake valve 23 with respect to the engine rotation (rotation of the crankshaft 11) by rotating the cam sprocket 42 relative to the camshaft 41.

The exhaust valve 33 of the engine 1 is opened and closed by an exhaust valve camshaft 45. The exhaust valve 33 is opened and closed with a fixed timing with respect to the engine rotation (i.e., the rotation of the crankshaft 11).

An intake throttle 51 is provided upstream of the intake collector 21. The intake throttle 51 is driven by a throttle motor 52. A fuel injection valve 53 is provided in the intake port 22. The fuel injection valve 53 is arranged and configured to inject fuel into the intake port 22. The fuel injection valve 53 is controlled by a control unit or controller 70. Injected fuel flows into the cylinder 10 along with air flowing through the intake passage 2 when the intake valve 23 is opened.

An air flow meter 61 serves to detect an intake air quantity. A VTC angle sensor 61 is provided to detect a crank angle corresponding to a valve open timing of the intake valve 23. A crank angle sensor 63 is provided to detect an engine rotational speed. An O2 sensor 64 is provided to detect oxygen contained in exhaust gas. A coolant temperature sensor 65 is provided to detect an engine coolant temperature. An accelerator position sensor 66 is provided to detect a depression amount of an accelerator pedal 35.

The controller 70 serves to control the fuel injection valve 53, a spark plug 12, the intake throttle 51 (throttle motor 52), and the VTC mechanism 40 based on detection signals from the aforementioned sensors. The controller 70 is basically a microcomputer comprising a central processing unit (CPU), a read only memory (ROM), a random access memory (RAM), and an output interface (I/O interface). It is also acceptable for the controller 70 to comprise a plurality of microcomputers. The microcomputer of the controller 70 is programmed to control the various components of the engine 1. The memory circuit stores processing results and control programs that are run by the processor circuit. The controller 70 is operatively coupled to the various components of the engine 1 in a conventional manner. The internal RAM of the controller 70 stores statuses of operational flags and various control data. The internal ROM of the controller 70 stores the preset maps and data used for various operations. The controller 70 is capable of selectively controlling any of the components of the control system in accordance with the control program. It will be apparent to those skilled in the art from this disclosure that the precise structure and algorithms for the controller 70 can be any combination of hardware and software that will carry out the intended functions.

When the intake valve 23 and the exhaust valve 33 are opened simultaneously, i.e., when there is a period of valve overlap, exhaust gas is blown back toward the intake valve 23. The present inventors turned their attention to the effect that exhaust gas blowback has on fuel injection during cold starting. More specifically, if a valve overlap period exists, then exhaust gas inside the cylinder 10 flows toward the intake port 22 when the intake valve 23 is opened. This flow is called "blowback." When an overlapping period exists during low rotational speed and/or low load conditions, such as when the engine 1 is started, a portion of the fuel injected into the intake port 22 before the intake valve 23 opens is blown onto an internal wall surface of the intake port 22 and does not flow into the cylinder 10. In response to this phenomenon, a conventional technology is configured such that an overlapping period does not occur during cold starting of an engine 1. However, during a period from when an engine 1 is cold started until a temperature of the intake valve 23 reaches a temperature at which the fuel can be vaporized, unburned hydrocarbons (HC) can be reduced more effectively by utilizing exhaust gas blowback to accelerate vaporization of the fuel than by eliminating the occurrence of blowback so as to prevent fuel from adhering to an internal wall surface of the intake port 22.

Figure 2:
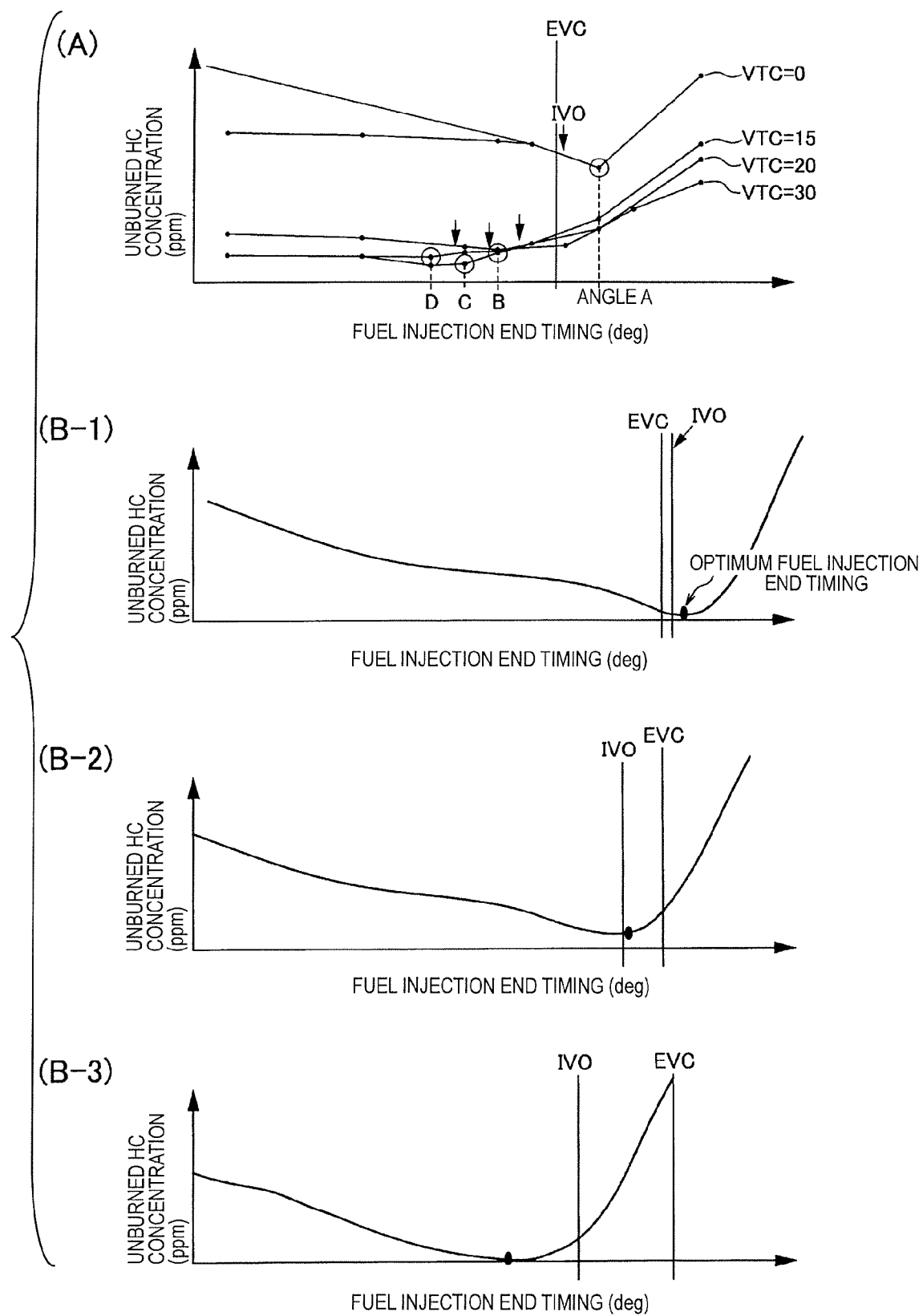
FIG. 2 is a series of graphs illustrating the concentration of unburned hydrocarbons versus the fuel injection timing for different valve overlap amounts.

Such a relationship is shown in FIG. 2. FIG. 2 shows graphs of the concentration of unburned hydrocarbons versus the fuel injection timing for different valve overlap amounts. Graph A of FIG. 2 shows trends of the concentration of unburned hydrocarbons versus the fuel injection timing for different intake valve open timings during cold starting.

Graph B-1 to Graph B-3 of FIG. 2 show an optimum injection end timing for different overlap amounts.

Graph A of FIG. 2 will now be explained. When a coolant temperature of the engine 1 is below freezing, an exhaust valve closing timing EVC is held constant and an intake valve open timing IVO is advanced such that an overlapping period is provided. The concentration of unburned hydrocarbons is shown on a vertical axis of the graph, and the fuel injection end timing (angle) is indicated on a horizontal axis. A separate graph of the concentration of unburned hydrocarbons versus the fuel injection end timing is shown as a line graph for each overlap amount. The overlap amount is established by the VTC mechanism 40. In the figure, the quantity indicated as VTC is a VTC angle, which is the angle (number of degrees) by which the VTC mechanism 40 has advanced the intake valve open timing IVO. The VTC angles shown are 0 degrees, 15, degrees, 20 degrees, and 30 degrees. A VTC angle of 0 degrees means the VTC mechanism 40 has not advanced the intake valve timing. When the VTC angle is 0 degrees, the intake valve open timing IVO is two degrees later than the exhaust valve close timing EVC. Thus, for example, when the VTC angle is 15 degrees, the intake valve open timing IVO is advanced by 15 degrees by the VTC mechanism 40 and the overlap amount is 13 degrees. The arrows in the figure indicate the intake valve open timing IVO, and the circled points on the line graphs indicate the fuel injection end timings where the concentration of unburned hydrocarbons is the lowest. When the VTC angle is 0 degrees, the fuel injection end timing at which the concentration of unburned hydrocarbons is lowest is an angle A. Similarly, the fuel injection end timing at which the concentration of unburned hydrocarbons is lowest is an angle B when the VTC angle is 15 degrees, an angle C when the VTC angle is 20 degrees, and an angle D when the VTC angle is 30 degrees.

The relationship of the concentration of unburned hydrocarbons with respect to the VTC angle is such that when the VTC angle is 0 degrees, the concentration of unburned hydrocarbons is lowest when the fuel injection end timing is set to occur after the intake valve open timing IVO. The larger the VTC angle becomes, the more fuel injection end timing is advanced with respect to the intake valve open timing IVO in order to achieve the lowest concentration of unburned hydrocarbons (HC). As is clear from the graph, a lower concentration of hydrocarbons can be achieved when the VTC angle is larger than 0. This trend is thought to be the result of high-temperature blowback exhaust gas accelerating vaporization of the fuel injected into the intake port 22. Thus, it should be clear that blowback exhaust gas flowing to the intake port 22 can be utilized effectively to reduce the amount of unburned hydrocarbons.

Graph B-1 to Graph B-3 of FIG. 2 show that the relationship of the optimum fuel injection end timing with respect to the overlap amount can be roughly divided into three patterns. Graph B-1 of FIG. 2 shows a case when the overlap amount is zero or negative. In this case, there is no blowback of exhaust gas and the fuel is injected such that the fuel injection end timing occurs after the intake valve open timing IVO. By injecting the fuel during the intake stroke, the amount of fuel sticking to the intake port and the intake valve can be reduced and, thus, the amount of hydrocarbons discharged can be reduced. Graph B-2 of FIG. 2 shows a case in which the overlap amount is small. In this case, the amount of blowback is small if it exists at all, and the fuel is injected such that the fuel injection end timing occurs substantially simultaneously with the intake valve open timing IVO or slightly after the intake valve open timing IVO. The terms of degree such as "substantially", "about" and "approximately" as used herein mean a reasonable amount of deviation of the modified term such that the end result is not significantly changed. In this way, the fuel can be efficiently atomized and drawn into the cylinder by a suction effect of the intake air, thereby reducing the amount of hydrocarbons discharged. Graph B-3 of FIG. 2 shows a case in which the overlap amount is large. In this case, there is a large amount of blowback and the fuel is injected such that the fuel injection end timing occurs before the intake valve open timing IVO. Since the effect of the blowback is large, the discharge of unburned hydrocarbons is reduced by reducing the amount of blowback.

In the example illustrated in FIG. 2, an overlap amount that can be considered to be a boundary value between a region of small blowback amount and a region of large blowback amount lies between zero and 13 degrees. The overlap amount boundary value varies depending on the engine. When the overlap amount is at the boundary value, the intake valve open timing IVO and the optimum fuel injection end timing are the same. As the intake valve open timing IVO is retarded or advanced from the boundary value, the difference between the intake valve open timing IVO and the optimum fuel injection end timing increases. Thus, a fuel injection timing that is optimum for achieving an effect of decreasing the amount of unburned hydrocarbons can be obtained by setting the fuel injection end timing based on the overlap amount.

Figure 3:
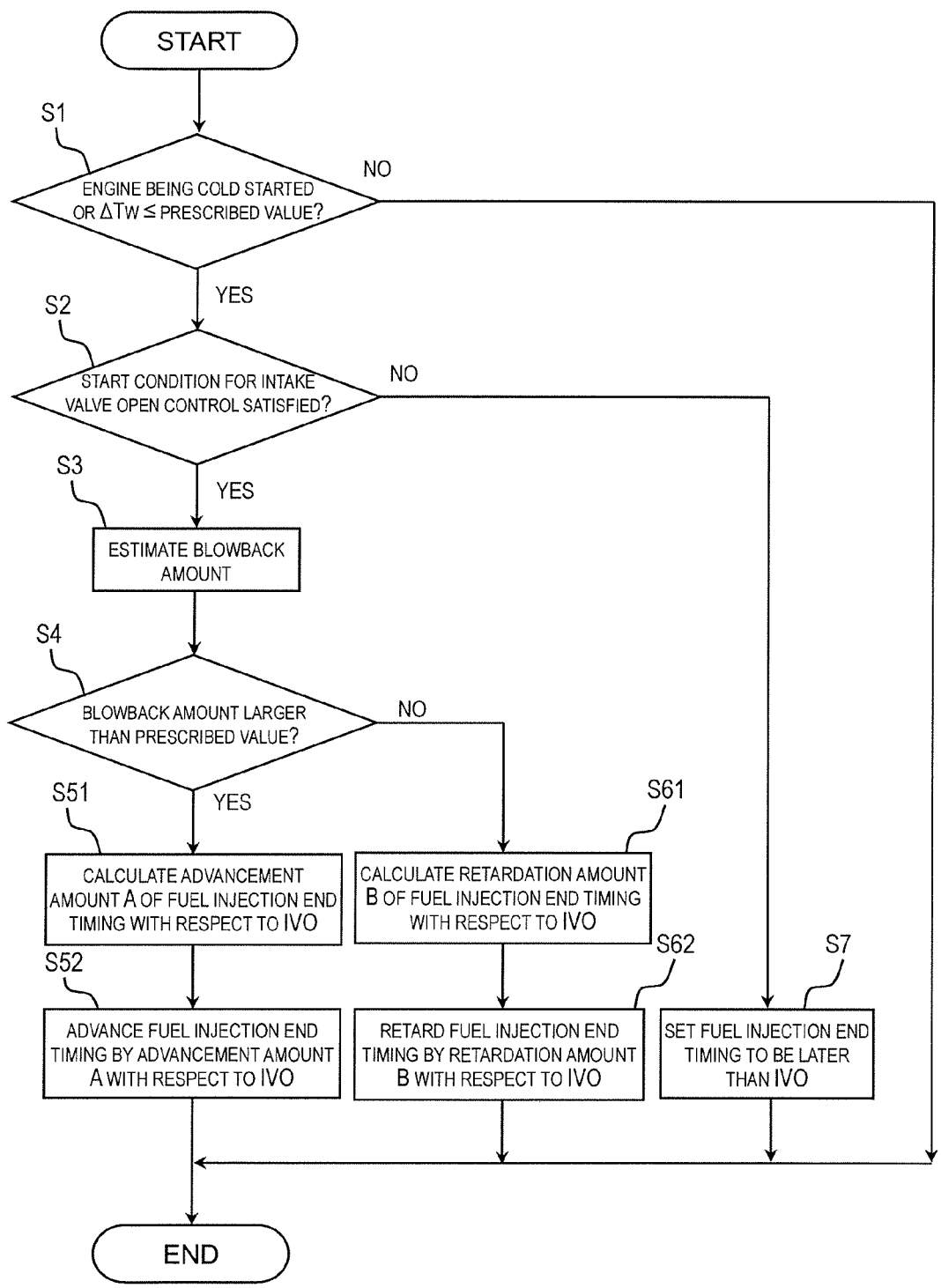
FIG. 3 is a main flowchart explaining the main control routine executed by the fuel injection control apparatus according to the first embodiment.

A control scheme for controlling the fuel injection timing in this manner will now be explained in detail with reference to FIG. 3. FIG. 3 is a flowchart for explaining operations executed by a fuel injection control apparatus in accordance with the embodiment. Generally speaking, the fuel injection control apparatus is configured to control a fuel injection of the fuel injection valve 53 provided in the intake port 23 of the engine 1 to reduce residual unburned hydrocarbons (unburned HC) by controlling a fuel injection timing appropriately during a cold start of the engine 1.

In step S1, the controller 70 reads a coolant temperature Tw of the engine detected by the coolant temperature sensor 65. If the engine 1 is being cold started or if a temperature increase amount ΔTw by which the coolant temperature of the engine 1 has risen since the engine 1 was cold started is smaller than a prescribed value, then the controller 70 proceeds to step S2. Otherwise, this control is not executed and a normal fuel injection control is executed. The prescribed value corresponds to an increase of the coolant temperature of the engine 1 since cold starting at which it can be assumed that the intake valve has risen to a temperature at which fuel can be vaporized.

In step S2, the controller 70 determines if a condition for starting a valve open control of the intake valve 23 has been satisfied. The determination can be made based on a hydraulic pressure state of the hydraulic pressure control mechanism 43 of the VTC mechanism 40. If the hydraulic pressure is equal to or larger than a value at which the VTC mechanism 40 can be operated, then the condition for starting a valve open control of the intake valve 23 has been satisfied. If the VTC mechanism 40 can be operated, then the controller 70 proceeds to step S3. If the VTC mechanism 40 cannot be operated, then the controller 70 proceeds to step S7. Step S2 of the flow chart constitutes an intake valve control section that is configured to change a valve open timing of the intake valve 23 during cold starting of the engine 1.

In step S3, the controller 70 estimates a blowback amount. The blowback amount is affected by the size of the overlap amount and an operating state of the engine 1. a map relating the blowback amount to the overlap amount and an operating state of the engine 1 is stored in the ROM in advance. The overlap amount can be detected based on an open/close control of the intake valve 23 and the exhaust valve 33. The blowback amount is estimated using the map. Step S3 of the flow chart constitutes a blowback amount estimating section that is configured to estimate an amount of blow-back exhaust gas flowing to the intake port 22 when the intake valve 23 is opened.

In step S4, the controller 70 determines if the estimated blowback amount is larger than a prescribed amount. The prescribed amount is determined based on an overlap amount at which the fuel injection end timing and the intake valve open timing IVO are the same, which, as explained previously, is where the effect of reducing unburned hydrocarbons is the highest. If the blowback amount is larger than the prescribed amount, then the controller 70 proceeds to step S51. If the blowback amount is equal to or smaller than the prescribed amount, then the controller 70 proceeds to step S61.

In step S51, the controller 70 calculates an advancement amount A of the fuel injection end timing with respect to the intake valve open timing IVO. The advancement amount A is found based on the overlap amount using a map. The map will be explained in more detail later.

In step S52, the controller 70 corrects (advances) the fuel injection end timing by the advancement amount A with respect to the intake valve open timing IVO.

In step S61, the controller 70 calculates a retardation amount B of the fuel injection end timing with respect to the intake valve open timing IVO. Similarly to the advancement amount A, the retardation amount B is found using a map corresponding to the overlap amount. The map will be explained in more detail later.

In step S62, the controller 70 corrects (retards) the fuel injection end timing by the retardation amount B with respect to the intake valve open timing IVO.

In step S7, the controller 70 sets the fuel injection end timing to occur after the intake valve open timing IVO. Here, the overlap amount is zero or negative. It is acceptable to find the fuel injection end timing using the same map as is used in step S51 or step S61. Steps S4 to S7 of the flow chart constitute a fuel injection timing control section that is configured to control a fuel injection timing in accordance with the blowback amount during a period from when the engine 1 is cold started until a temperature of the intake valve rises to a temperature at which a fuel can vaporize.

Figure 4:
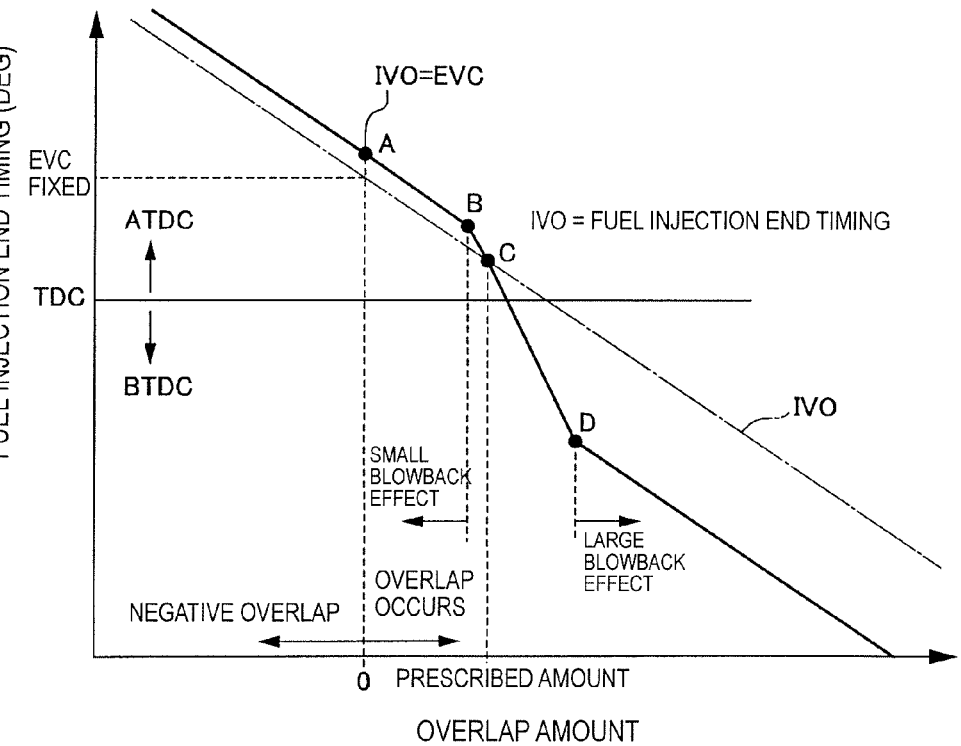
FIG. 4A is a graph of the fuel injecting timing expressed in terms of the crank angle versus the overlap amount.
FIG. 4B is a graph of the fuel injecting timing expressed in terms of the correction amount of the fuel injection end timing from the intake valve open timing IVO with respect to the overlap amount.
Figure 4:
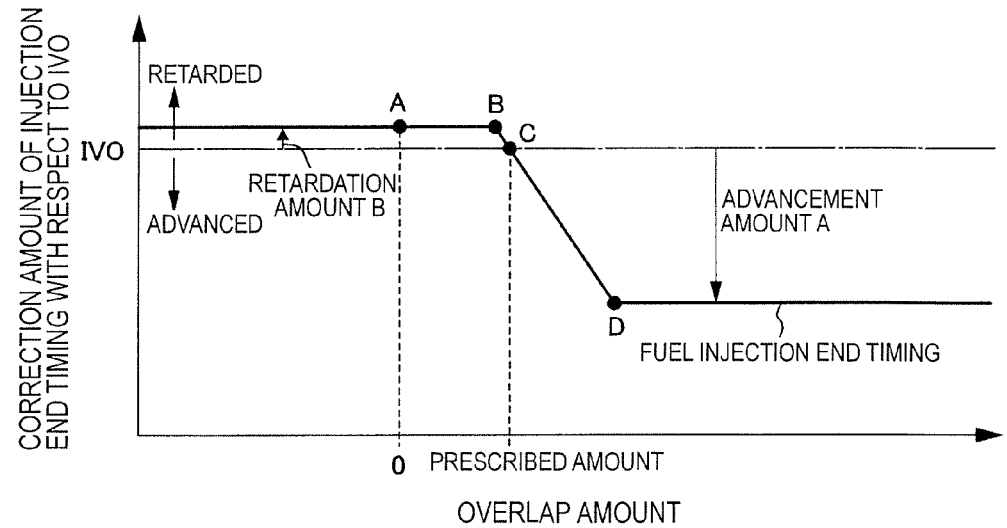

A map used in this embodiment to find the advancement amount A or the retardation amount B of the fuel injection end timing with respect to the intake valve open timing IVO based on the overlap amount will now be explained with reference to FIGS. 4A and 4B. FIGS. 4A and 4B show a relationship between the blowback amount (valve overlap amount) and the fuel injection end timing. FIG. 4A is a graph of the fuel injection end timing expressed in terms of the crank angle versus the overlap amount. FIG. 4B is a modified version of FIG. 4A that expresses the correction amount of the fuel injection end timing from the intake valve open timing IVO with respect to the overlap amount in a fashion that is easier to understand. The overlap amount is also expressed in terms of the crank angle (degrees).

In this embodiment, the fuel injection end timing is substantially constant with respect to the overlap amount when the effect of blowback is small. When the effect of blowback is small, the fuel injection end timing occurs at a substantially constant crank angle after the intake valve open timing IVO and does not change in response to the intake valve open timing IVO or the exhaust valve close timing EVC. The fuel injection end timing is also substantially constant with respect to the overlap amount when the effect of blowback is large. When the effect of blowback is large, the fuel injection end timing occurs at a substantially constant crank angle before the intake valve open timing IVO and does not change in response to the intake valve open timing IVO or the exhaust valve close timing EVC. Meanwhile, when the effect of blowback is in an intermediate stage while changing from a small effect to a large effect, the fuel injection end timing changes at a substantially constant rate with respect to the overlap amount. A point A indicates a state in which the intake valve open timing IVO coincides with the exhaust valve close timing EVC, a point B indicates a state corresponding to a maximum overlap amount at which the controller 70 will definitely determine that the effect of blowback is small, a point C indicates a state in which the intake valve opening timing IVO coincides with the fuel injection end timing, and a point D indicates a state corresponding to a minimum overlap amount at which the controller 70 will definitely determine that the effect of blowback is large. FIG. 4B expresses a timing difference between the fuel injection end timing and the intake valve open timing IVO. The retardation amount B of the fuel injection end timing from the intake valve open timing IVO is constant at overlap amounts up to an overlap amount corresponding to the point B, where the effect of blowback is small. Meanwhile, the advancement amount D of the fuel injection end timing from the intake valve open timing IVO is constant at overlap amounts equal to or larger than an overlap amount corresponding to the point D, where the effect of blowback is large. In a range of overlap amounts between point B and point D, the correction amount is varied according to the overlap amount. In the range from the point B to the point C, the fuel injection end timing is corrected to a later timing (retarded). At the point C, the correction amount is zero. In the range from point C to point D, the fuel injection end timing is corrected to an earlier timing (advanced). Using this map, a correction amount, i.e., an advancement amount A or a retardation amount B, of the fuel injection end timing with respect to the intake valve open timing IVO can be found based on the overlap amount.

Figure 5:
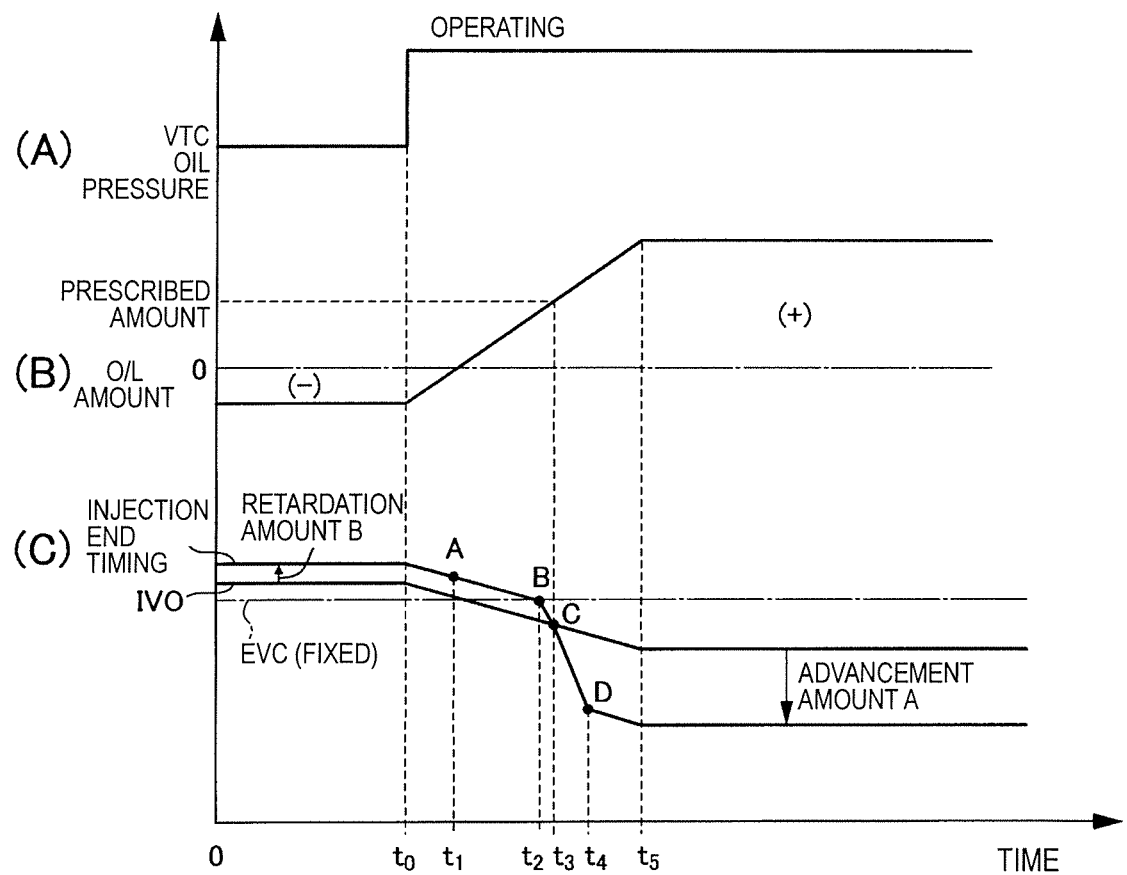
FIG. 5 is a time chart illustrating the control executed by the fuel injection control apparatus for explaining a fuel injection control according to the first embodiment.

FIG. 5 is a time chart for explaining a fuel injection control according to this embodiment. In the explanation below of the time chart of FIG. 5, the steps of the flowchart of FIG. 3 are provided to clarify the correspondence with respect to the flowchart.

After the engine 1 is started, the VTC mechanism 40 is not operated (part (A) of FIG. 5, "No" in step S1 or S2) and the overlap amount is negative (part (B) of FIG. 5 until a time t0. The fuel injection end timing is set to be retarded by a retardation amount B with respect to the intake valve open timing IVO (part (C) of FIG. 5, step S7).

After the time t0, the VTC mechanism 40 is operated (part (A) of FIG. 5, "Yes" in steps S1 and S2) and the VTC mechanism advances the intake valve open timing IVO such that a target overlap amount is achieved (part (B) of FIG. 5). The target overlap amount changes according to a load and a rotational speed of the engine. A blowback amount is estimated based on the overlap amount (step S3). In this embodiment, the overlap amount and the blowback amount are proportional to each other.

During a period from the time t0 until a time t2, the overlap amount changes from negative to positive at a time t1 and the blowback amount is smaller than a prescribed amount (part (B) of FIG. 5, "No" in step S4). During this period, the fuel injection end timing is set to be retarded by a retardation amount B with respect to the intake valve open timing IVO (part (C) of FIG. 5, steps S61 and S62). The retardation amount B is constant (fixed).

During a period from the time t2 until a time t3, the overlap amount continues to increase in the positive direction and the blowback amount remains smaller than a prescribed amount (part (B) of FIG. 5, "No" in step S4). The fuel injection end timing is set to be retarded by a retardation amount B with respect to the intake valve open timing IVO (part (C) of FIG. 5, steps S61 and S62). The retardation amount B changes gradually toward zero. At the time t3, the fuel injection end timing becomes coincident with the intke valve opening timing IVO (part (C) of FIG. 5).

After the time t3, the overlap amount exceeds the prescribed amount and the blowback amount becomes larger than the prescribed value (part (B) of FIG. 5, "Yes" in step S5). The blowback amount increases gradually from the time t3 until a time t4. At the time t4, the blowback amount reaches a value at which a sufficient effect of lowering the amount of unburned hydrocarbons can be obtained. The fuel injection end timing is set to be advanced by an advancement amount A with respect to the intake valve open timing IVO (part (C) of FIG. 5, steps S51 and S52). The advancement amount A gradually increases in response to the blowback amount during the period from the time t3 until the time t4.

The overlap amount continues to increase during a period from the time t4 until the time t5. At the time t5, the overlap amount reaches the target overlap amount (part (B) of FIG. 5). The fuel injection end timing is set to be advanced by an advancement amount A with respect to the intake valve open timing IVO (part (C) of FIG. 5, steps S51 and S52). The advancement amount A is fixed (part (C) of FIG. 5).

With this embodiment, the fuel injection timing is controlled such that the blowback of exhaust gas is utilized during a period from when the engine is cold started until a temperature of the intake valve 23 rises to a temperature at which the fuel can be vaporized. When fuel is injected into the intake port 22, the fact that the intake valve 23 (which faces the combustion chamber 10) reaches a high temperature is utilized by injecting the fuel toward the intake valve 23. This is done because the fuel is vaporized by the heat of the intake valve 23. However, during cold starting of a conventional engine, fuel injected toward the intake port 23 does not vaporize because the intake valve 23 has not yet reached a high temperature. Consequently, the fuel adheres to an internal wall surface of the intake port 22. Since blow-back exhaust gas flowing to the intake port 22 has a high temperature, the control is configured to control the fuel injection end timing with respect to the intake valve open timing IVO such that exhaust gas blowback is utilized to promote vaporization of the fuel during cold starting. This approach is contrary to a conventional technology in which the intake valve open timing IVO is controlled such that exhaust gas blowback does not occur during cold starting. The approach used in the conventional technology was based on a belief that a collision between the injected fuel and the blowback exhaust gas would cause more fuel to adhere to an internal wall surface. With the approach adopted in the present disclosure, the amount of unburned hydrocarbons discharged can be greatly reduced in comparison with the conventional technology.

Since the manner in which unburned hydrocarbons are reduced depends on the blowback amount, the fuel injection end timing is varied according to the blowback amount. Since the blowback amount is estimated based on the overlap amount, the blowback amount can be estimated easily without incurring such costs as the cost of a separate sensor.

When the blowback amount is larger than the prescribed amount, the fuel injection is controlled to occur in advance of the intake valve open timing IVO. As a result, the injected fuel is vaporized by blow-back exhaust gas that flows to the intake port 22 after the intake valve open timing IVO. The vaporized fuel is then drawn into the cylinder 10. Thus, the blowback can be utilized to reduce the amount of unburned hydrocarbons on an internal wall of the intake port 22.

When the blowback amount is equal to or smaller than the prescribed amount, the fuel injection is controlled to occur later than the intake valve open timing IVO. Since the fuel is injected while the intake valve 23 is open, the fuel can be drawn directly into the cylinder 10. Thus, the amount of unburned hydrocarbons on an internal wall of the intake port 22 can be reduced.

The fuel injection end timing is advanced or retarded with respect to the intake valve open timing IVO based on the blowback amount. The correction amount (advancement amount or retardation amount) of the fuel injection end timing is calculated based on the blowback amount using a map. The blowback amount is estimated based on the overlap amount. In this embodiment, an appropriate fuel injection end timing can be set by reading a correction amount of the fuel injection end timing from the map based on the overlap amount (blowback amount). Also, a fuel injection timing control that is highly effective at reducing unburned hydrocarbon emissions of the engine 1 can be continued during a period from when the engine 1 is cold started until a temperature of the intake valve 23 reaches a temperature at which fuel can be vaporized. As a result, the fuel efficiency of the engine 1 can be increased.

A second embodiment will now be explained in which the fuel injection control apparatus is equipped with a lift/operating angle varying mechanism 110 in addition to the VTC mechanism 40 of the first embodiment. The lift/operating angle varying mechanism 110 is configured to vary a lift amount of the intake valve 23 in accordance with an operating angle of the intake valve 23.

Figure 6:
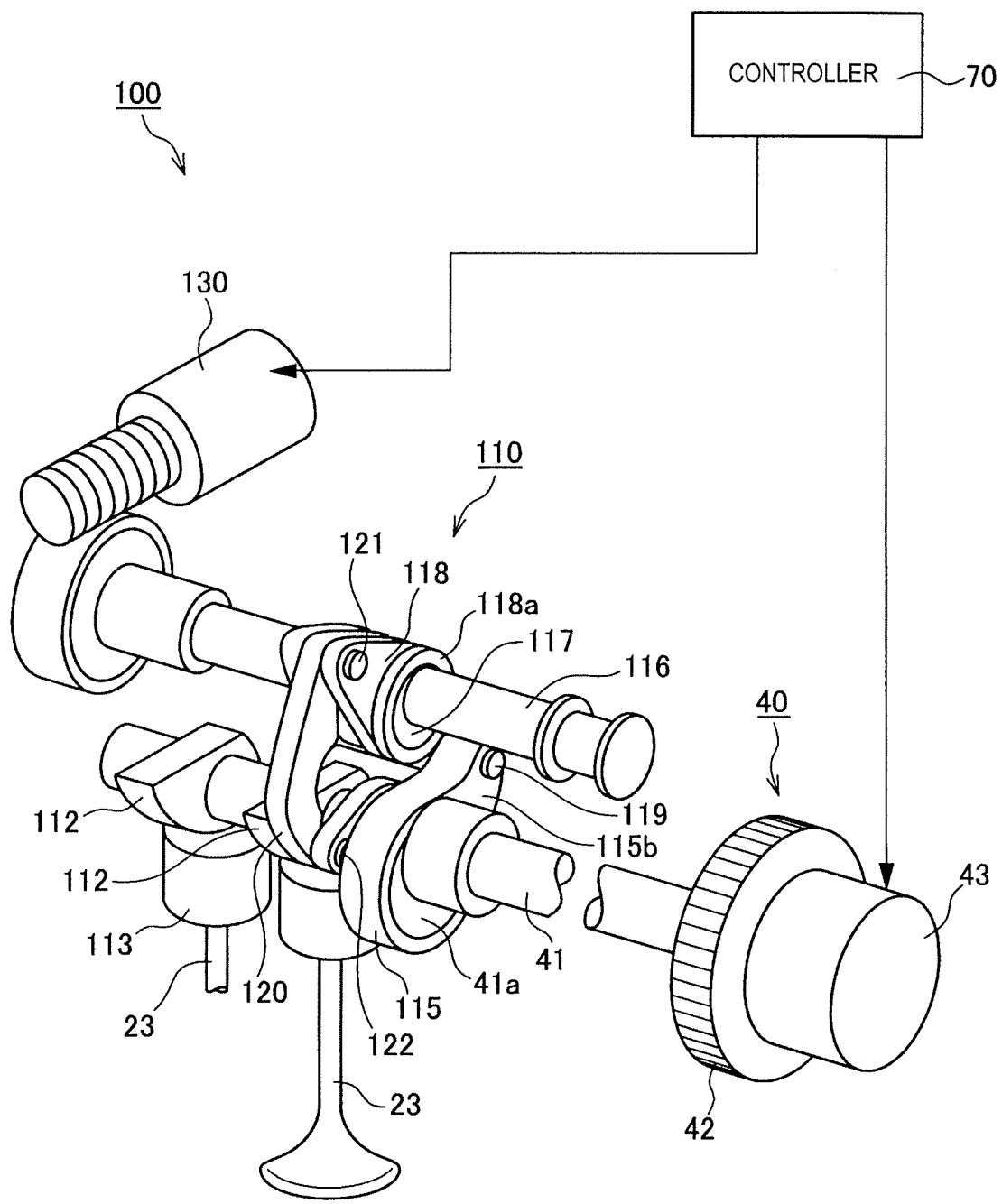
FIG. 6 is a perspective view of a variable valve operating mechanism according to a second embodiment.

FIG. 6 is a perspective view of a variable valve operating device 100 serving to control the open and close timings of the intake valve 23 in the second embodiment. In FIG. 6, only one pair of intake valves 23 and related parts corresponding to one cylinder are shown in a simplified form. The variable valve operating device 100 includes the VTC mechanism 40 and the lift/operating angle varying mechanism 110. Parts having the same function as parts described previously are indicated with the same reference numerals and explanations thereof are omitted for brevity.

Constituent features of the lift/operating angle varying mechanism 110 will now be explained. In the second embodiment, the cam shaft 41 extends along the direction in which the cylinders 10 are arranged. The cam shaft 41 is provided above the intake valves 23. The camshaft 41 is arranged to rotate about an axial center in coordination with a crankshaft. The camshaft 41 is linked to the crankshaft with a belt or a chain (not shown) connected to a cam sprocket 42 provided on one end of the camshaft 41. A pair of rocking cams 112 is rotatably provided on the cam shaft 41. One pair of rocking cams 112 is provided with respect to each cylinder. The operation of the variable valve operating device 100 will be explained in more detail later, but, briefly, each of the intake valves 23 is lifted in a downward direction when it is pressed by a valve lifter 113. Each of the valve lifters 113 is positioned below one of the rocking cams 112 and is pushed downward when the rocking cam 112 turns about the camshaft 41 through a prescribed rotational range. Both rocking cams 112 of each pair are fixed at the same rotational phase by a cylindrical member or other means.

A generally cylindrical cam 41a is formed integrally on the camshaft 41. The cam 41a is fixed to the camshaft 41 in a position separated from the rocking cams 112 by a prescribed distance in an axial direction. A link arm 115 is rotatably fit onto an external surface of the cam 41a.

A rotatably supported control shaft 116 is arranged diagonally above the camshaft 41 so as to extend parallel to the camshaft 41 in a cylinder arrangement direction.

A lift amount control actuator 130 is provided at one end of the control shaft 116 and serves to rotate the control shaft 116 within a prescribed range of rotational angles. The lift amount control actuator 130 is controlled by a control signal issued from the control 70 in accordance with a detected operating condition of the engine 1.

A control cam 117 is formed integrally on the control shaft 116. A rocker arm 118 is rotatably fitted onto an external surface of the control cam 117. The rocker arm 118 is arranged to rock about an axial centerline of the control cam 117.

The rocker arm 118 extends in generally opposite directions perpendicular to an axial direction from a central base end portion 118a supported on the control cam 117. In other words, the extension directions of the rocker arm 118 are oriented toward the pin 121 and toward the pin 119, respectively, from the base end portion 118a (see FIGS. 6 and 7). One end portion of the rocker arm 118 is coupled to a protruding end 115b of the link arm 115 with a coupling pin 119 such that the rocker arm 118 is positioned above the link arm 115. The coupling pin 119 passes through both the rocker arm 118 and the link arm 115. Another end portion of the rocker arm 118 is coupled to an end portion of a link member 120 with a coupling pin 121 passing through both the rocker arm 118 and the link member 120. Another end portion of the link member 120 is coupled to the rocking cam 112 with a coupling pin 122 such that the rocking cam 112 is positioned below the rocker arm 118. The coupling pin 122 passes through both the link member 120 and the rocking cam 112.

The operation of the lift/operating angle varying mechanism 110 will now be explained.

Figure 7A:
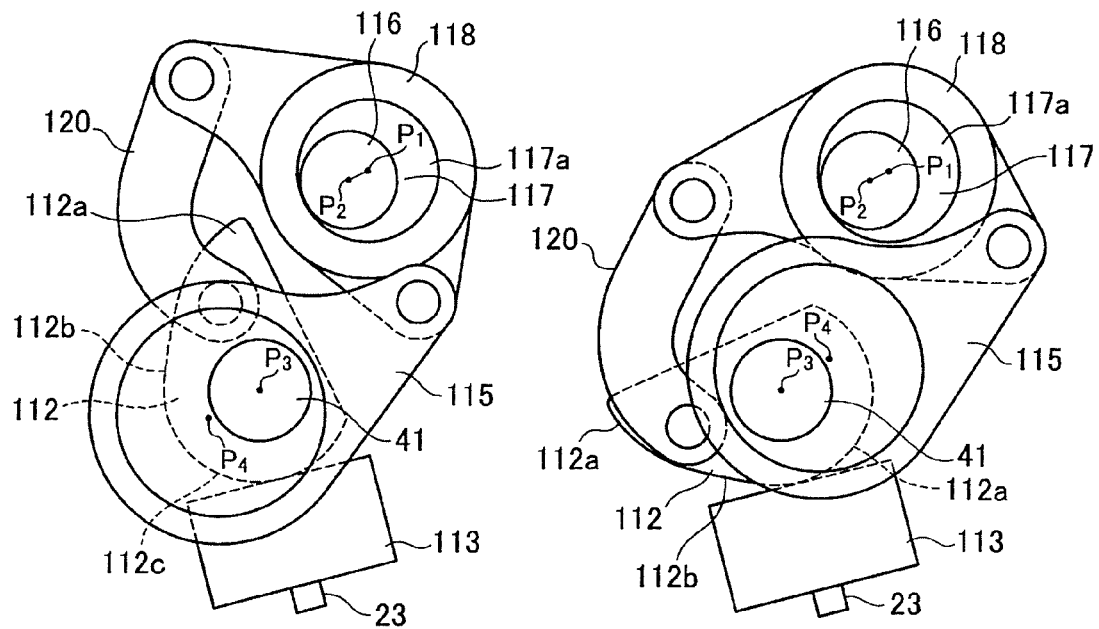
FIG. 7 shows views of a lift/operating angle varying mechanism as seen along a drive shaft direction.
Figure 7B:
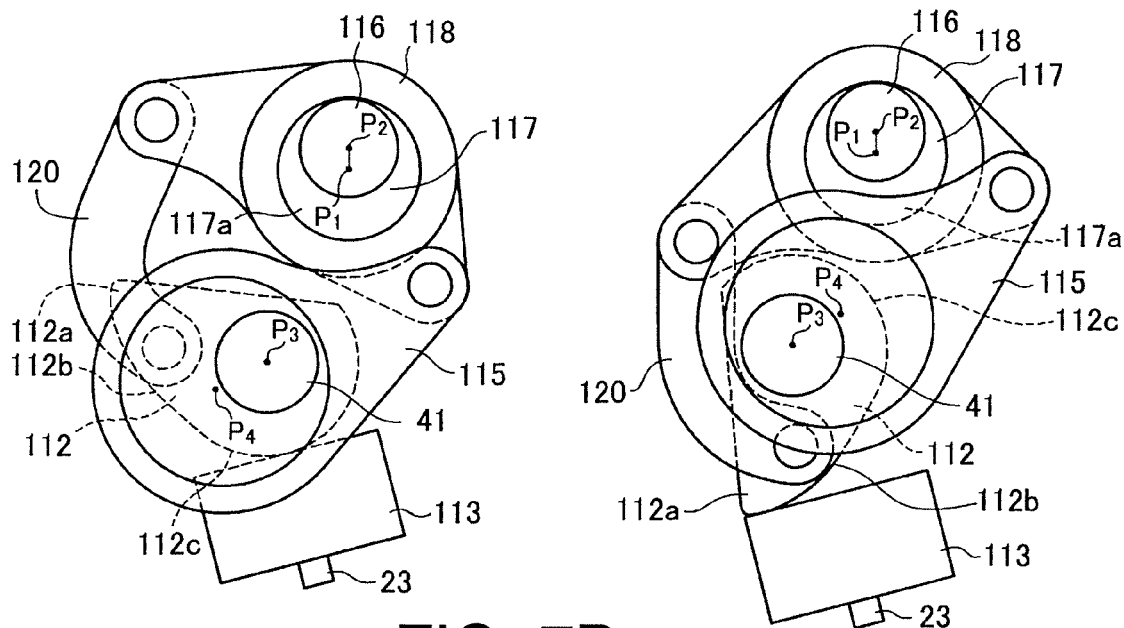

FIGS. 7A and 7B show views of a lift/operating angle varying mechanism 110 as seen along a drive shaft direction. FIG. 7A shows an intake valve 23 in a minimally rocked position and a maximally rocked position, respectively, when the rocking cam 112 in a zero lift state. FIG. 7B shows an intake valve 23 in a minimally rocked position and a maximally rocked position, respectively, when the rocking cam 112 in a full lift state.

A zero lift state of the intake valve 23 is a state in which the intake valve 23 is not lifted by the cam (i.e., the lift amount of the intake valve 23 is zero). Conversely, a full lift state of the intake valve 23 is a state in which the valve 23 is lifted by a maximum lift amount.

As shown in FIG. 7A, when a center P1 of the control cam 117 is positioned higher than center axis P2 of the control shaft 116 and a thick-walled portion 117a of the control cam 117 is positioned generally above the control shaft 116, the rocker arm 118 is positioned generally higher and an end portion 112a of the rocking cam 112 is pulled upward to a relatively high position. Thus, an initial position of the rocking cam 112 is such that a cam surface 112b of the rocking cam 112 is tilted away from the valve lifter 113 (see the left side of FIG. 7A). When the rocking cam 112 rocks due to rotation of the drive shaft 41, a base circular surface 112c remains in contact with the valve lifter 113 longer and the cam surface 112b contacts the valve lifter 113 for a shorter period of time. Consequently, the maximum lift of the intake valve 23 is small (see the right side of FIG. 7A). Also, the range of crank angles from the open timing to the close timing of the intake valve 23, i.e., the operating angle (open duration) of the intake valve 23, is shorter.

As shown in FIG. 7B, when a center P1 of the control cam 117 is positioned lower than center axis P2 of the control shaft 116 and a thick-walled portion 117a of the control cam 117 is positioned generally above the control shaft 116, the rocker arm 118 is positioned generally lower and an end portion 112a of the rocking cam 112 is pushed downward to a relatively low position. Thus, an initial position of the rocking cam 112 is such that a cam surface 112b of the rocking cam 112 is tilted toward the valve lifter 113 (see the left side of FIG. 7B). When the rocking cam 112 rocks due to rotation of the drive shaft 41, the portion of the rocking cam contacting the valve lifter 113 changes immediately from the base circular surface 112c to the cam surface 112b. Consequently, the maximum lift of the intake valve 23 is large (see the right side of FIG. 7B). Also, the operating angle (open duration) of the intake valve 23 increases.

Figure 8:
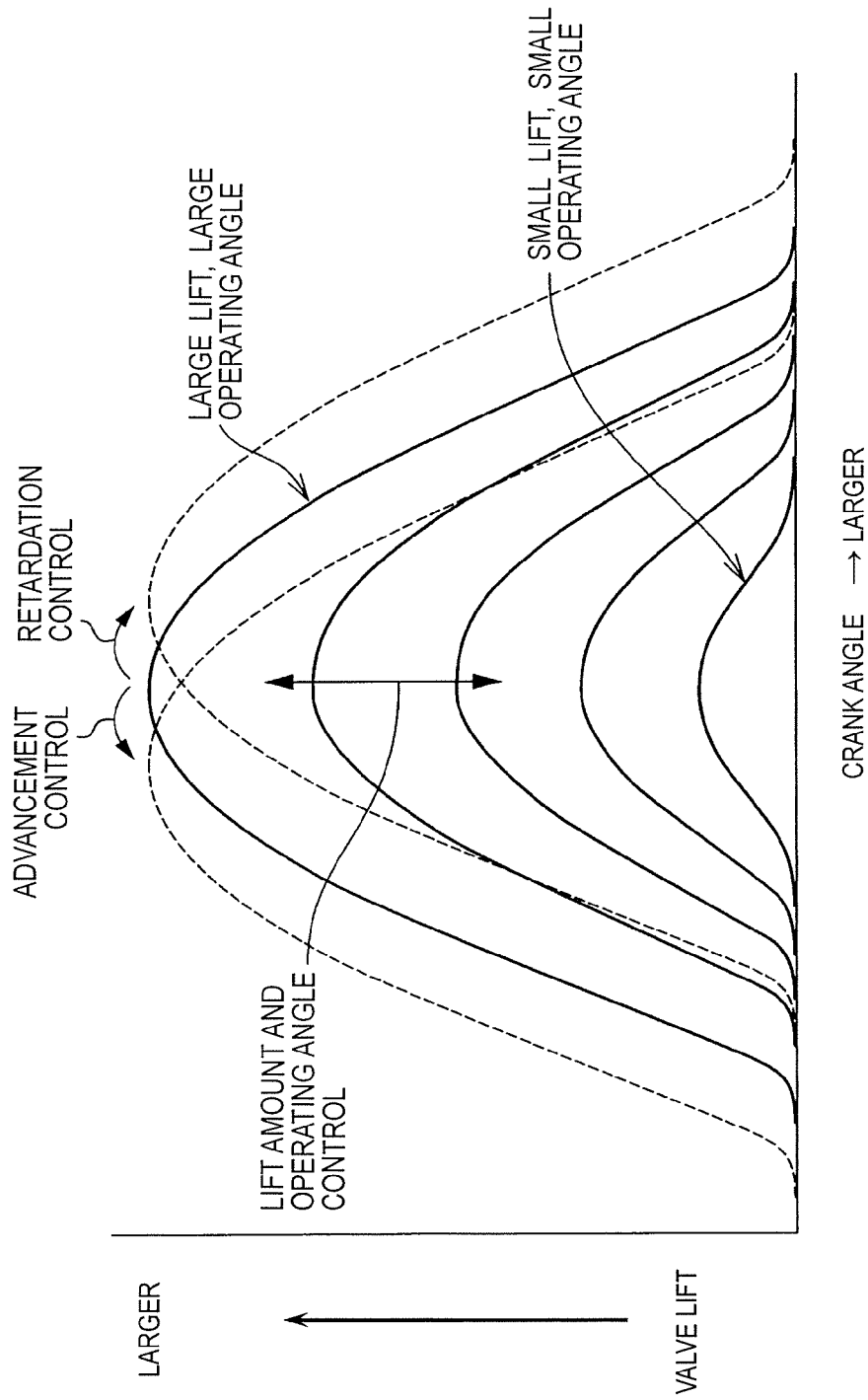
FIG. 8 is a graph for explaining operational effects of the variable valve operating mechanism.

FIG. 8 is a graph for explaining operational effects of the variable valve operating mechanism 100.

The initial position of the control cam 117 (mentioned previously with reference to FIGS. 7A and 7B) can be varied in a continuous manner and, thus, a valve lift characteristic of the intake valve 23 can be varied in a continuous manner. As indicated in FIG. 8 with solid-line curves, the lift/operating angle varying mechanism 110 of the variable valve operating device 100 can increase and decrease the lift amount and the operating angle of the intake valve 23 simultaneously in a continuous manner. Although it depends on the layout of the parts, the open timing and the close timing of the intake valve 23 change substantially symmetrically in response to variation of the lift amount and operating angle of the intake valve 23.

As indicated with broken-line curves in FIG. 8, the VTC mechanism 40 of the variable valve operating device 100 can advance or retard a lift center angle. In this way, by combining a lift/operating angle varying mechanism 110 and a VTC mechanism 40, the variable valve operating device 100 can open and close the intake valve 23 at any desired crank angle position and set an open timing of the intake valve 23 to any desired timing. In short, any desired valve timing can be set for the intake valve 23.

In addition to the control executed in the first embodiment, this second embodiment executes a control of the fuel injection end timing in consideration a rate of suction into the cylinder 10 when the blowback amount is zero or smaller than a prescribed amount. Suction into the cylinder 10 occurs when a pressure inside the cylinder 10 is sufficiently smaller than a pressure inside the intake passage 2 while the intake valve 23 is open. More specifically, as the piston 13 descends from top dead center TDC during a period from the exhaust stroke through the intake stroke, the volume inside the cylinder 10 gradually increases. Thus, the pressure inside the cylinder 10 decreases while the intake valve 23 is closed. When the intake valve 23 opens, intake air inside the intake passage 2 is sucked strongly into the cylinder 10. Suction occurs when the intake valve 23 does not open immediately after the piston 13 passes top dead center TDC, i.e., when there is a large amount of negative overlap.

This second embodiment is equipped with the lift/operating angle varying mechanism 110 that can increase and decrease the lift amount and the operating angle of the intake valve 23 in a continuous manner. The smaller the operating angle of the intake valve 23 is, the larger the amount of negative overlap is and air is sucked into the cylinder 10 due to the aforementioned pressure difference. Also, the valve lift amount of the intake valve 23 becomes smaller. When the valve lift is small, the flow speed of the suction is fast. In short, the smaller the operating angle is, the stronger the tendency for suction to occur becomes and the faster the suction speed becomes.

Figure 9A:
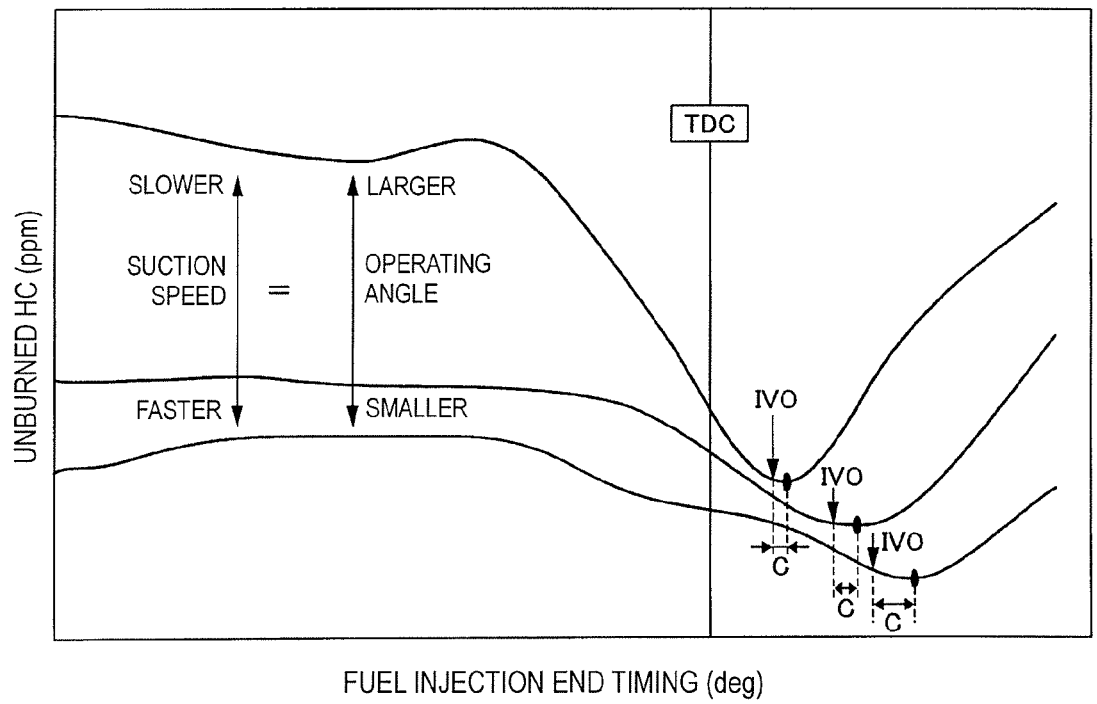
FIG. 9A is a graph illustrating optimum injection end timings for different operating angles to show a relationship of the concentration of unburned hydrocarbons versus the fuel injection timing for different intake rates.
Figure 9B:
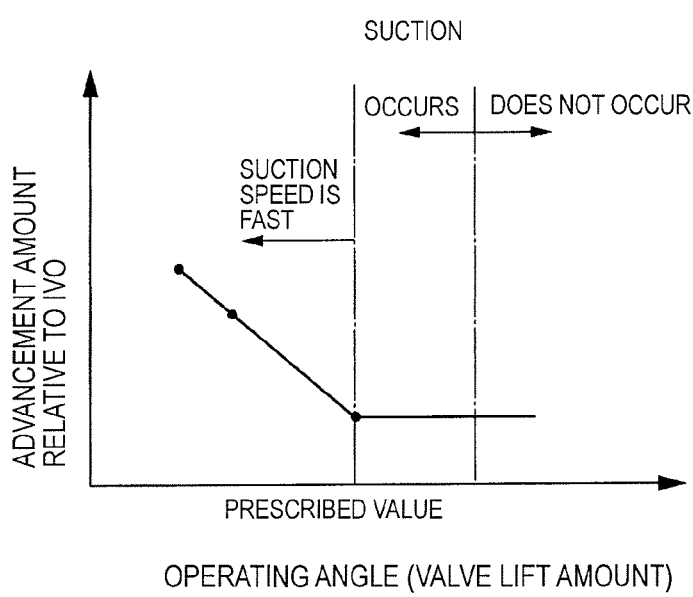
FIG. 9B is a graph illustrating a retardation amount of the fuel injection end timing from the intake valve open timing IVO versus the operating angle of the intake valve to show a relationship of the concentration of unburned hydrocarbons versus the fuel injection timing for different intake rates.

FIGS. 9A and 9B show a relationship of the concentration of unburned hydrocarbons versus the fuel injection timing for different suction speeds in this embodiment. FIG. 9A shows optimum injection end timings for different operating angles. FIG. 9B is a graph of a retardation amount C of the fuel injection end timing from the intake valve open timing IVO versus the operating angle of the intake valve 23.

As shown in FIG. 9A, as the operating angle decreases, the amount of negative overlap becomes larger and the intake valve open timing IVO moves farther from top dead center TDC. The smaller the operating angle becomes, the more effectively retarding the fuel injection end timing with respect to the intake valve open timing IVO serves to reduce the concentration of unburned hydrocarbons HC. FIG. 9B shows how the retardation amount C of the fuel injection end timing with respect to the intake valve open timing IVO changes in accordance with the operating angle.

Figure 10:
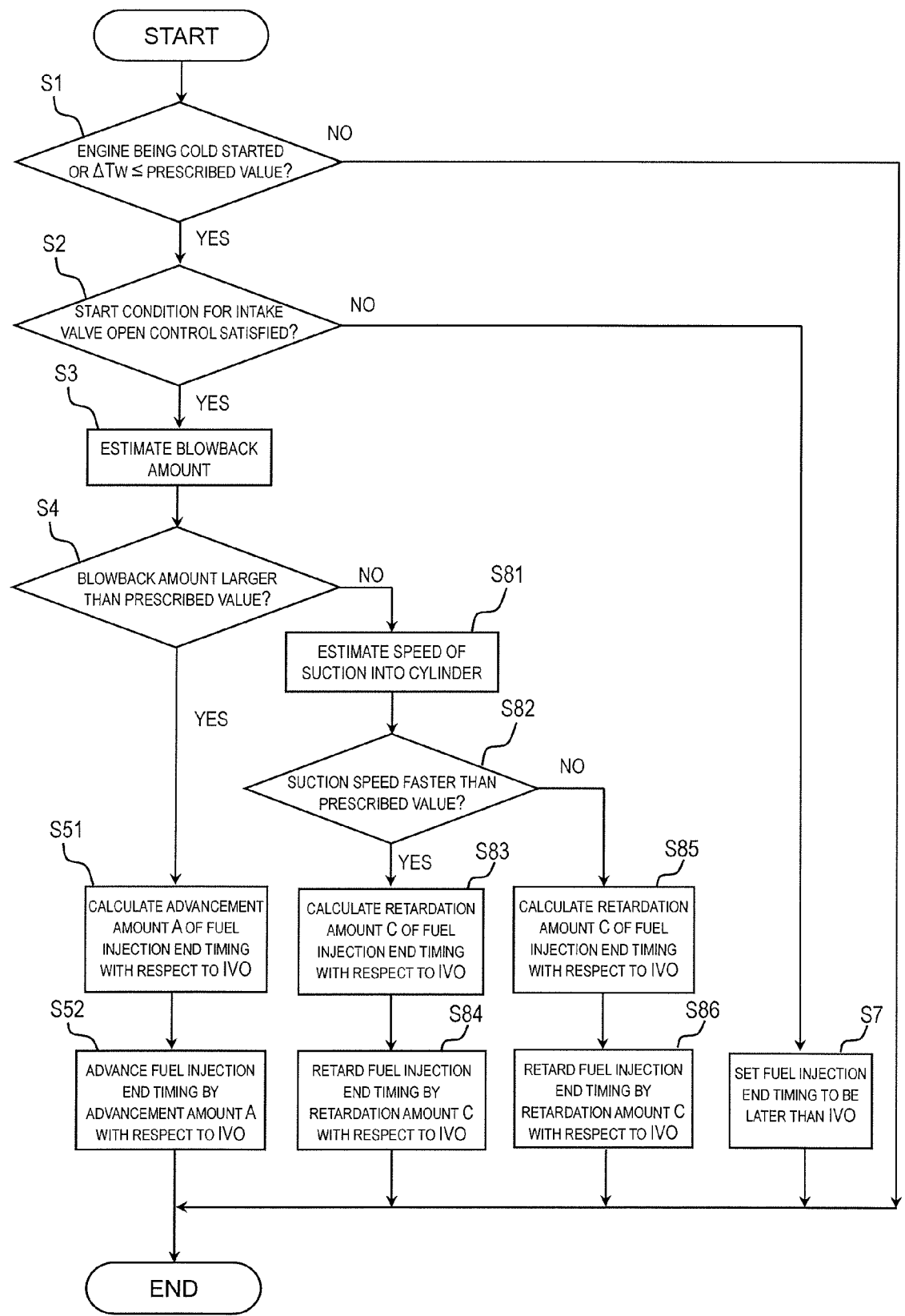
FIG. 10 is a main flowchart explaining the main control routine executed by the fuel injection control apparatus according to the second embodiment.

As mentioned previously, the smaller the operating angle is, the more suction occurs and the faster the suction speed is assumed to become. As shown in FIG. 9B, when the suction speed is faster than a prescribed value, the fuel injection end timing is retarded with respect to the intake valve open timing IVO in accordance with the suction speed. Since the effect of suction is larger when the operating angle is smaller, the fuel injection end timing is set such that fuel is carried by the flow caused by the suction. The faster the suction speed is, the larger the retardation amount C is set to be. When the suction speed is equal to or below a prescribed value, the fuel injection end timing is retarded by a fixed amount with respect to the intake valve open timing IVO. When a suction affect cannot be obtained, it is acceptable to execute the same control (steps S61 and S62) as is executed in the first embodiment when the blowback amount is equal to or below a prescribed amount. A control scheme for controlling the fuel injection timing in this manner will now be explained in detail with reference to FIG. 10. FIG. 10 is a flowchart for explaining operations executed by a fuel injection control apparatus in accordance with this embodiment. Steps S81 to S86 constitute a control unique to this embodiment and will now be explained. The other steps are the same as in the first embodiment.

If the exhaust gas blowback amount is zero or smaller than a prescribed amount, i.e., if the overlap amount is negative or small ("No" in step S4), then the controller 70 proceeds to step S81.

In step S81, the controller 70 estimates a suction speed of intake air into the cylinder. The suction speed is estimated based on the operating angle of the intake valve 23. The operating angle of the intake valve 23 can be detected based on an operating angle target value from the controller 70 or an actual operating angle detected by a known sensor (not shown). The suction speed becomes faster as the operating angle becomes smaller. The suction speed can also be estimated based on a pressure difference between a cylinder pressure (pressure inside cylinder) and an intake air pressure at the intake valve open timing IVO. The suction speed will be fast if the cylinder pressure is much smaller than the intake pressure at the intake valve open timing IVO.

In step S82, the controller 70 determines if the suction speed is faster than a prescribed value. The prescribed value is a boundary value between a suction speed region where suction does not affect the optimum fuel injection end timing and a suction speed region where suction does affect the optimum fuel injection end timing. The prescribed value differs depending on the particular engine. If the suction speed is faster than the prescribed value, then the controller 70 proceeds to step S83. Otherwise, the controller 70 proceeds to step S85.

In step S83, the controller 70 calculates a retardation amount C of the fuel injection end timing with respect to the intake valve open timing IVO. A relationship of the suction speed and the retardation amount C is arranged into a map like that shown in FIG. 9B.

In step S84, the controller 70 corrects (retards) the fuel injection end timing by the retardation amount C with respect to the intake valve open timing IVO.

In step S85, the controller 70 calculates a retardation amount C of the fuel injection end timing with respect to the intake valve open timing IVO in the same manner as in step S83.

In step S86, the controller 70 corrects (retards) the fuel injection end timing by the retardation amount C with respect to the intake valve open timing IVO.

Figure 11:
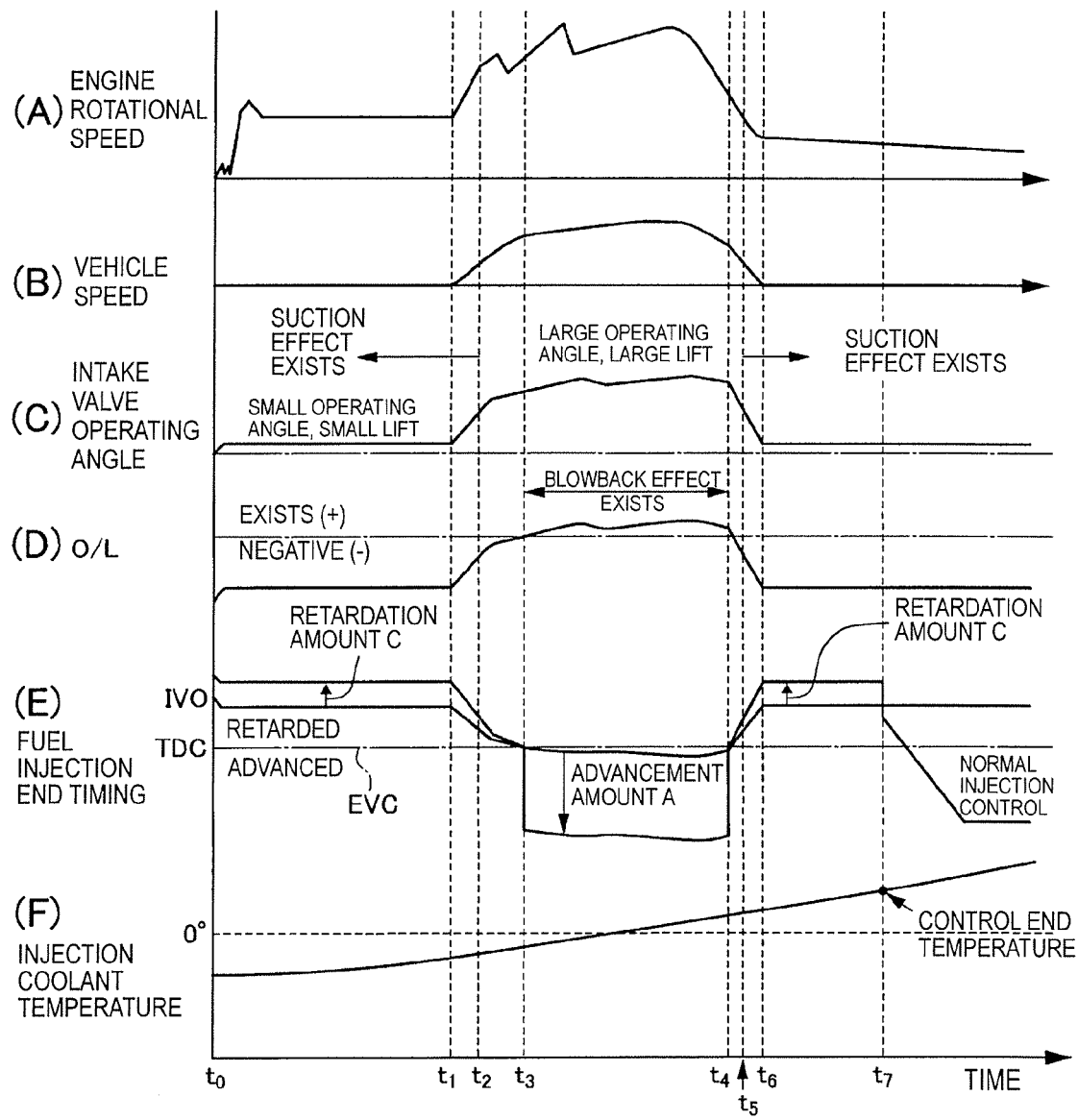
FIG. 11 is a time chart illustrating the control executed by the fuel injection control apparatus for explaining a fuel injection control according to the second embodiment.

FIG. 11 is a time chart for explaining a fuel injection control according to this embodiment. In the explanation below, the steps of the flowchart of FIG. 10 are provided to clarify the correspondence with respect to the flowchart.

At a time t0 the engine is cold started, and the engine idles until a time t1 (graphs (A), (B), and (F) of FIG. 11). During this period, the intake valve 23 is set to a small operating angle and a small lift amount and the overlap amount is a large negative value (graphs (C) and (D) of FIG. 11). Under these conditions, exhaust blowback does not occur ("No" in step S4) and intake air flows rapidly into the cylinder due to suction (step S81 and "Yes" in step S82). In order to expose the fuel to the high-speed flow moving toward the inside of the cylinder and thereby promote vaporization of the fuel, the fuel injection end timing is retarded by a retardation amount C with respect to the intake valve open timing IVO (steps S83 and S84).

During a period from the time t1 until a time t2, the vehicle is gradually accelerated and the engine rotational speed increases (graphs (A) and (B) of FIG. 11). At the same time, the operating angle and lift amount of the intake valve 23 gradually increase from the aforementioned small operating angle and a small lift amount. The overlap amount remains negative but the magnitude of the lift amount decreases (graphs (C) and (D) of FIG. 11). During this period, suction still yields an effect (step S4→S81→"Yes" in step S82) and the fuel injection end timing is retarded by a retardation amount C with respect to the intake valve open timing IVO (steps S83 and S84).

During a period from the time t2 until a time t3, the engine rotational speed increases further (graph (A) of FIG. 11). The intake valve 23 is set to a large operating angle and a large lift amount and the intake valve open timing IVO is advanced (graph (E) of FIG. 11). At the time t3, the intake valve open timing IVO and the exhaust valve close timing EVC meet and the overlap amount becomes zero (graph (D) of FIG. 11). Since the overlap amount is negative, exhaust gas blowback does not occur and suction does not occur either (step S4→S81→"No" in step S82). Also, the fuel injection end timing is retarded by a retardation amount C with respect to the intake valve open timing IVO (steps S85 and S86). During this period, the engine changes from a state in which suction has an effect to a state in which exhaust blowback has an effect. While the fuel injection end timing is retarded relative to the intake valve open timing IVO in the former state, the fuel injection end timing is advanced relative to the same in the latter state. Thus, starting from the time t2, the retardation amount C of the fuel injection end timing with respect to the intake valve open timing IVO is gradually decreased to zero (graph (E) of FIG. 11).

During a period from the time t3 until a time t4, the vehicle enters a traveling state (graphs (A) and (B) of FIG. 11). During this period, the intake valve 23 is set to a large operating angle and a large lift amount and the overlap amount is a positive value (graphs (C) and (D) of FIG. 11). Since exhaust gas blowback occurs and the blowback has an effect, the fuel injection end timing is advanced by an advancement amount A with respect to the intake valve open timing IVO (steps S4→S51→S52).

During a period from the time t4 to a time t5, the same control is executed as in the period from the time t2 until the time t3 because the state of the engine is the same.

During a period from the time t5 to a time t6, the same control is executed as in the period from the time t1 until the time t2 because the state of the engine is the same.

During a period from the time t6 to a time t7, the same control is executed as in the period from the time t0 until the time t1 because the state of the engine is the same. At the time t7, the engine coolant temperature reaches a temperature serving as a condition for ending the control. This control is ended and the controller 70 proceeds to a normal fuel injection control because the intake valve 23 has reached a temperature at which it can vaporize fuel injected into the intake port 22.

With this embodiment, the effect of suction into the cylinder is taken into account in addition to being able to vary the operating angle and the lift amount of the intake valve 23 simultaneously. Since the effect that the suction speed has on reducing the amount of unburned hydrocarbons is taken into account in addition to the effect of exhaust gas blowback, the hydrocarbon reduction effect can be improved.

While only selected embodiments have been chosen to illustrate the present invention, it will be apparent to those skilled in the art from this disclosure that various changes and modifications can be made herein without departing from the scope of the invention as defined in the appended claims. For example, in the embodiments the blowback amount is estimated based on the overlap amount, but the invention is not limited to such an approach. It is also acceptable to estimate the blowback amount using a sensor configured to detect a gas flow or temperature in the intake port. In the embodiments, the map indicating the fuel injection end timing versus the intake valve open timing IVO is configured such that the advancement amount A is fixed when the overlap amount is equal to or larger than a prescribed amount and the retardation amount B is fixed when the overlap amount is equal to or smaller than a prescribed amount. However, the invention is not limited to such a map. For example, it is acceptable to prepare a map in which the advancement amount A and the retardation amount B are corrected as necessary in accordance with the overlap amount. Although in the second embodiment the lift/operating angle varying mechanism varies the lift amount and the operating angle in a continuous manner, it is acceptable to use a mechanism that varies only the lift amount. Also, although in the second embodiment the fuel injection end timing is retarded with respect to the intake valve open timing IVO in a manner that takes suction into account, the invention is not limited to such an approach. Depending on the engine specifications, it may be acceptable to advance the fuel injection end timing with respect to the intake valve open timing IVO. If the suction speed is extremely fast, fuel adhered to a back side of a head portion of the intake valve will be drawn into the cylinder by the suction flow.

Thus, the foregoing descriptions of the embodiments according to the present invention are provided for illustration only, and not for the purpose of limiting the invention as defined by the appended claims and their equivalents.

What is claimed is:

1. An engine fuel injection control apparatus comprising:
   an intake port;
   a fuel injection valve provided in the intake port;
   a variable valve device that at least varies an intake valve open timing of an intake valve provided downstream of the fuel injection valve; and
   a controller operatively connected to the variable valve device and the fuel injection valve to adjust the variable valve device and a fuel injection timing of the fuel injection valve,
   the controller controlling a fuel injection end timing in accordance with an overlap amount of the intake valve and an exhaust valve, and
   the controller adjusting the fuel injection timing such that the fuel injection end timing is more advanced than the intake valve open timing and such that as an amount by which the overlap amount exceeds a prescribed overlap amount becomes larger, a time interval between the fuel injection end timing and the intake valve open timing is set to become increasingly larger, upon determining that the engine is being cold started and the overlap amount is larger than the prescribed overlap amount.

2. The engine fuel injection control apparatus as recited in claim 1, wherein
   the controller adjusts the fuel injection timing such that the fuel injection end timing is more retarded than the intake valve open timing upon determining that the engine is being cold started and the overlap amount is negative.

3. The engine fuel injection control apparatus as recited in claim 1, wherein
   the controller adjusts the fuel injection timing such that the fuel injection end timing becomes substantially the same as the intake valve open timing upon determining that the engine is being cold started and the overlap amount is a positive overlap amount that is smaller than the prescribed overlap amount.

4. The engine fuel injection control apparatus as recited in claim 1, wherein
   the controller sets the fuel injection timing such that the fuel injection end timing is fixed at a timing more retarded than the intake valve open timing and not varied according to the overlap amount upon determining that the engine is being cold started and the overlap amount is a positive overlap amount that is smaller than the prescribed overlap amount.

5. The engine fuel injection control apparatus as recited in claim 1, wherein
   the controller adjusts the fuel injection timing such that the fuel injection end timing is fixed at a timing more advanced than the intake valve open timing and not varied according to the overlap amount upon determining that the engine is being cold started and the overlap amount larger than a second prescribed overlap amount that is larger than the prescribed overlap amount.

6. An engine fuel injection control apparatus comprising:
an intake port;
a fuel injection valve provided in the intake port;
a variable valve device that at least varies an intake valve open timing of an intake valve provided downstream of the fuel injection valve; and
a controller operatively connected to the variable valve device and the fuel injection valve to regulate the variable valve device and a fuel injection timing of the fuel injection valve,
the controller further including
a temperature estimating section that estimates a temperature of the intake valve; and
a temperature determining section that determining when a temperature of the intake valve has reached a prescribed temperature at which fuel can be vaporized,
the controller controlling a fuel injection end timing in accordance with an overlap amount of the intake valve and an exhaust valve, and
the controller setting the fuel injection timing such that as the overlap amount becomes larger, the fuel injection timing is set to become increasingly more advanced during a period from when the engine is cold started until a temperature of the intake valve reaches the prescribed temperature at which fuel can be vaporized.

7. The engine fuel injection control apparatus as recited in claim 6, wherein
the controller sets a fixed close timing for an exhaust valve of the engine.

8. The engine fuel injection control apparatus as recited in claim 6, wherein
the controller controls the intake valve open timing such that after a temperature of the intake valve reaches the prescribed temperature at which fuel can be vaporized during cold starting, the controller controls the intake valve open timing such that the overlap amount becomes smaller and sets the fuel injection end timing to be further advanced with respect to the intake valve open timing.

9. An engine fuel injection control apparatus comprising:
an intake port;
a fuel injection valve provided in the intake port;
a variable valve device that at least varies an intake valve open timing of an intake valve provided downstream of the fuel injection valve; and
a controller operatively connected to the variable valve device and the fuel injection valve to adjust the variable valve device and a fuel injection timing of the fuel injection valve;
the controller further including a blowback amount estimating section that estimates an amount of blown back exhaust gas flowing into the intake port at an open timing of the intake valve,
the controller adjusting the variable valve device during cold starting of the engine such that the open timing of the intake valve occurs earlier than a close timing of an exhaust valve, and
the controller controlling the fuel injection timing in accordance with the blowback amount, setting a fuel injection end timing to be more retarded than an open timing of the intake valve upon determining that the blowback amount is zero or smaller than a prescribed value, and setting the fuel injection end timing to occur during an exhaust stroke and at a timing more advanced than a valve open timing of the intake valve upon determining that the blowback amount is larger than a prescribed value.

10. The engine fuel injection control apparatus as recited in claim 9, wherein
the blowback amount estimating section estimates a blowback amount based on a length of an overlapping period during which the exhaust valve and the intake valve are both open.

11. The engine fuel injection control apparatus as recited in claim 9, further comprising
a suction speed estimating section that estimates a suction speed of intake air into a cylinder, with the controller setting an interval between the fuel injection end timing and the intake valve open timing such that as the suction speed increases beyond a prescribed value, the interval becomes larger upon determining that the blow back amount is equal to or smaller than a prescribed amount or zero.

12. The engine fuel injection control apparatus as recited in claim 11, wherein
the suction speed estimating section estimates the suction speed based on a lift amount of the intake valve.

13. The engine fuel injection control apparatus as recited in claim 9, wherein
the variable valve device includes at least one of
a variable valve timing mechanism that changes the intake valve open timing of the intake valve while keeping an operating angle and a lift amount of the intake valve constant, and
a lift/operating angle varying mechanism that changes a lift amount of the intake valve in accordance with an operating angle of the intake valve.

* * * * *